(12) United States Patent
Winkler et al.

(10) Patent No.: US 6,997,694 B2
(45) Date of Patent: Feb. 14, 2006

(54) EXTRUDER

(75) Inventors: Reinhold Winkler, Hennef (DE); Dieter Thewes, Troisdorf (DE); Wieslaw Walach, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 10/768,720

(22) Filed: Jan. 30, 2004

(65) Prior Publication Data

US 2004/0250639 A1    Dec. 16, 2004

(30) Foreign Application Priority Data

Feb. 1, 2003   (EP) .................... 03002272

(51) Int. Cl.
*B29C 47/00*  (2006.01)
*B29C 47/08*  (2006.01)

(52) U.S. Cl. .................. 425/207; 366/83; 366/84; 366/85; 366/86; 366/297; 366/301; 366/331; 366/70

(58) Field of Classification Search .............. 425/207; 366/70, 83, 84, 85, 86, 297, 301, 331
See application file for complete search history.

(56) References Cited

U.S. PATENT DOCUMENTS

| | | | |
|---|---|---|---|
| 296,878 A * | 4/1884 | Rutschman | 425/207 |
| 806,502 A * | 12/1905 | Rutschman | 425/207 |
| 2,373,468 A * | 4/1945 | Glenn | 425/207 |
| 3,425,640 A * | 2/1969 | Hans et al. | 241/236 |
| 4,170,150 A | 10/1979 | Selbach | |
| 4,857,250 A * | 8/1989 | Gale et al. | 264/83 |
| 4,900,156 A * | 2/1990 | Bauer | 366/85 |
| 5,019,310 A * | 5/1991 | Kobayashi | 264/122 |
| 5,267,847 A * | 12/1993 | Bohm et al. | 425/145 |
| 5,783,226 A * | 7/1998 | Chi | 425/205 |
| 5,937,712 A | 8/1999 | Maris | |
| 5,962,036 A * | 10/1999 | Hauck | 425/190 |
| 6,523,997 B1 * | 2/2003 | Cotteverte et al. | 366/331 |
| 6,846,103 B1 * | 1/2005 | Okamoto et al. | 366/297 |
| 2002/0064084 A1 | 5/2002 | Meyer | |

FOREIGN PATENT DOCUMENTS

| | | |
|---|---|---|
| DE | 44 30 176 | 2/1996 |
| DE | 299 10 332 | 11/2000 |
| GB | 2347643 A * | 9/2000 |

OTHER PUBLICATIONS

1 Search Report.

* cited by examiner

*Primary Examiner*—Robert Davis
(74) *Attorney, Agent, or Firm*—Herbert Dubno

(57) ABSTRACT

An extruder drive has a housing, at least two extrusion worms each having a drive shaft extending into the housing, and at least one drive motor including at least one cylindrical stator fixed in the housing and a cylindrical rotor cooperating with the stator so as to be rotatably driven by the stator. The rotor surrounds the drive shafts, and each of the drive shafts is independently connected to the rotor for driving thereby.

10 Claims, 4 Drawing Sheets ers or screws in the housing that mesh or
EXTRUDER

FIELD OF THE INVENTION

Our present invention relates to an extruder and, more particularly, to an extruder drive assembly of the type comprising a housing and a mechanism for driving at least two extrusion worms or screws in the housing that mesh or interdigitate with each another.

BACKGROUND OF THE INVENTION

A double-worm or double-screw extruders has a housing with at least two compartments extending over its length and a drive at an end of the housing for rotating the screws or worms in the same or opposite senses. The screws are rotatable in the respective chambers of the extruder housing and have their flights intercalated so that they subject a synthetic-resin mass to plastification and liquefication. The extruder also pressurizes the thermoplastified mass so as to force the synthetic resin material through an extrusion die or into a mold.

The drive housing has a mechanism for rotating the worms or screws and the principles described are applicable not only to two-worm extruders but also extruders having more than two worms. It is common to provide so-called double-worm or double-screw extruders with a drive motor which is coupled to the two worms or screws. For example, the extruder screws can be connected by means of a transmission with the drive motor. depending on the type of drive or transmission used, the double-screw extruder can be relatively bulky. In addition, the transmission or drive may be subject to failure and the maintenance thereof can be comparatively expensive.

In one system, each of the screws or worms with a double-screw extruder can be separately driven by a respective drive motor and corresponding transmission. To achieve synchronism between the two extruder screws, the two drives can be coupled with one another. This arrangement also is quite voluminous and there always may be problems with the reliability of the synchronism system. In addition, such double-screw extruders are comparatively expensive.

These earlier systems lack a simple, space-saving drive system for a multiscrew extruder with reliable synchronism of the extruder screws.

OBJECTS OF THE INVENTION

It is therefore the principal object of the present invention to provide an improved extruder drive assembly, especially for a system having at least two extrusion worms or screws that avoids the drawbacks of earlier systems.

Another object of the invention is to provide an improved extruder drive assembly, especially for a double-worm extruder, where reliability problems are eliminated and the extruder drive can be made at low cost and very compact.

SUMMARY OF THE INVENTION

These objects are achieved, in accordance with the invention in an extruder drive assembly having a housing, at least two extrusion worms each having a drive shaft extending into the housing, and at least one drive motor including at least one cylindrical stator fixed in the housing and a cylindrical rotor cooperating with the stator so as to be rotatably driven by the stator. The rotor surrounds the drive shafts that are each independently connected to the rotor for driving thereby and are not directly connected with each other.

According to a feature of the invention, the extruder drive comprises a drive housing and at least one drive motor with a stator and rotor. Each of the two extruder worms has a connecting shaft at least partly encompassed within the drive housing. In the drive housing there is at least one cylindrical stator and this stator surrounds a cylindrical rotor. The two extruder worms with their connecting shafts are independently connected with the rotor, but out of direct contact with each other. As has already been indicated in the preferred embodiment, the apparatus is a double-worm extruder.

According to a preferred embodiment of the invention a cylindrical stator is mounted in the drive housing and surrounds a single cylindrical rotor that in turn is connected with both of the connecting shafts of the two extruder screws or worms. It is possible in accordance with the invention that the rotor is directly connected to one shaft or at least one shaft, i.e. without the interposition of further elements.

In a highly preferred embodiment, the single rotor is internally toothed and each of the shafts is formed like a gear with external toothing, usually in the form of a pinion. In this embodiment, the outer gear teeth of the rotor, which is thus a ring gear, mesh directly with at least one of the pinions and thus form a direct transmission link therebetween. The pinions of both shafts can mesh directly with the teeth of the ring gear, namely, the rotor. In this manner a synchronous drive of the worms in the same sense is effective.

In a second embodiment of the invention, the gear of one of the worms meshes directly with the gear teeth of the rotor and the gear of the other worm is connected to the rotor via an intervening direction-changing gear. In this case, the worms are driven synchronously in opposite senses. It has been found to be advantageous to use only a single intervening gear and thereby achieve the opposite sense rotation of the worm.

According to yet another preferred embodiment of the invention, two cylindrical stators are provided in the drive housing and each stator surrounds a cylindrical rotor and each cylindrical rotor is formed as an internally toothed gear ring which is connected with a respective connecting shaft of a respective worm or screw. In this case, the worms can be driven in the same or opposite senses depending upon the sense of rotation of the respective rotor and intervening gear elements between the toothed shaft of each worm and the respective rotor are unnecessary.

According to another preferred embodiment of the invention two cylindrical stators are provided in the drive housing and each stator surrounds a cylindrical rotor. Each of the cylindrical rotors is connected with the connection shaft of one of the two worms or screws. According to a first embodiment of this mode of the invention, each of the cylindrical rotors is directly connected with the connection shaft of the associated worm or screw. The term "direct" here refers to the absence of an intervening gear or member between the connection shaft and the internally toothed rotor. In this first embodiment of this mode of the invention, advantageously the two drive motors with their respective rotor and stators are offset from one another with respect to the longitudinal direction or transversely in order to provide an especially compact construction. Correspondingly one of the mesh shafts can be longer than the other.

In a second embodiment with reference to this mode of the invention, at least one cylindrical rotor is connected by an intervening element with the connection shaft of the associated worm or screw. Preferably, however, both cylindrical rotors can be connected by an intermediate element with connection shafts of the respective worm or screw. Advantageously one cylindrical rotor is connected directly with an intermediate shaft and the intermediate shaft is in turn connected with the connection shaft of the respective worms or screws. Preferably the intervening shaft carries a first gear which meshes with a second gear arranged on the respective connection shaft. The resulting gear connections or gear trains can be offset from one another longitudinally or transversely in the drive housing to provide a highly space-saving arrangement. With the system of the invention, therefore, the worms or screws can be driven in the same sense or in opposite senses in a particularly convenient and simple manner.

The invention is based upon the fact that an extruder can have a relatively simple construction and, especially, can be driven in a compact manner. All of the systems required for imparting torque to the screw or worm and/or controlling the direction of displacement is located within the housing. The fact that the rotor and stator lie in a common plane and that the connection of the shaft to the rotor is likewise in that plane contributes to the compactness of the system. The invention eliminates the need for complex transmissions, distributing gearing and the like and, of course, the maintenance associated therewith.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
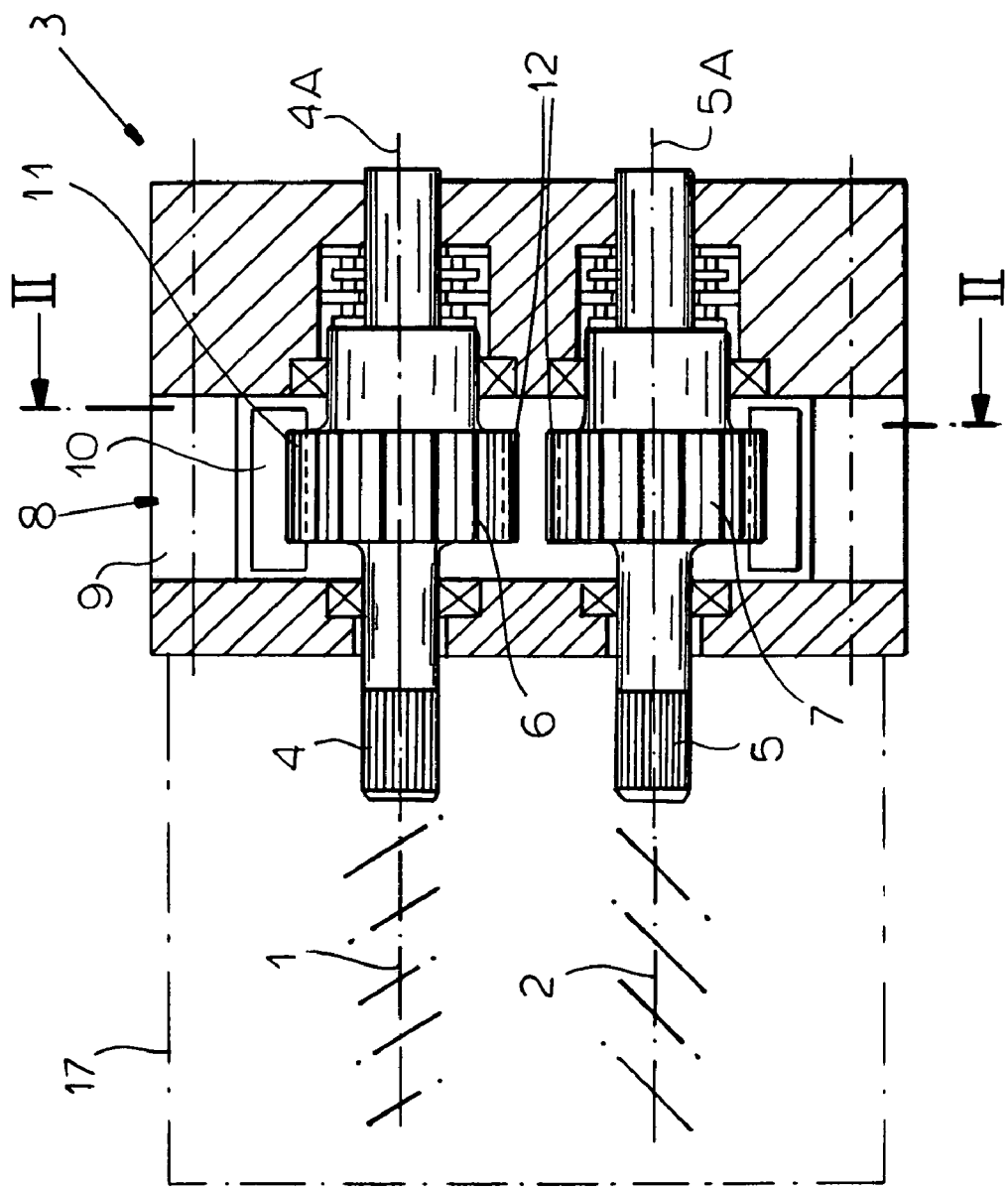
FIG. 1 is a partial cross sectional view through an extruder drive housing in accordance with the invention.
Figure 2:
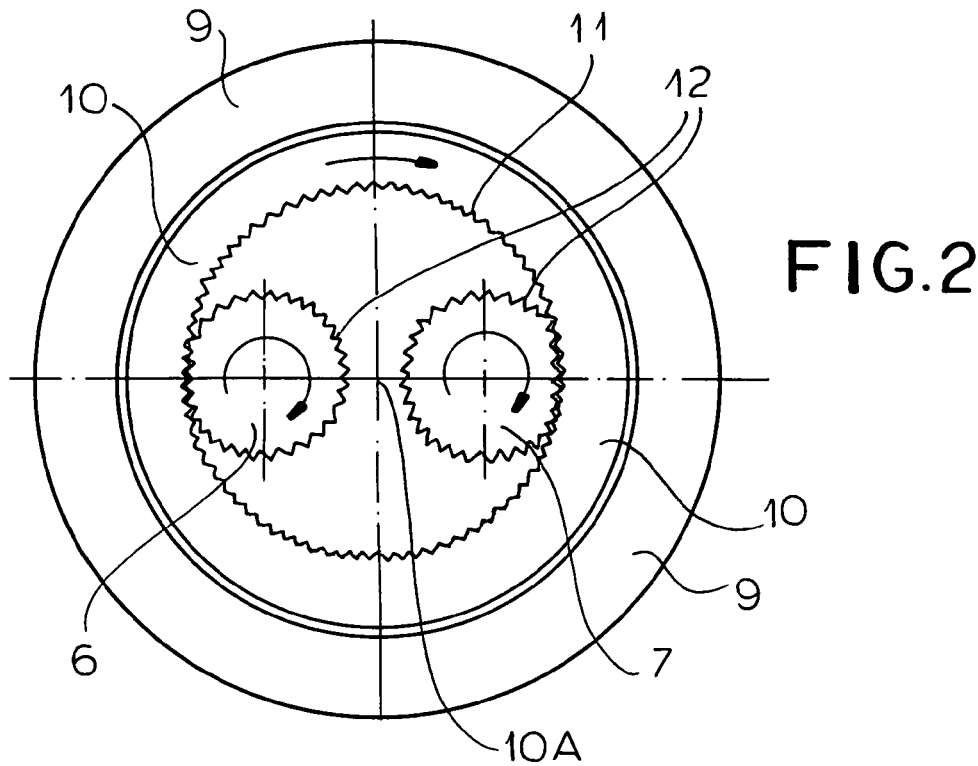
FIG. 2 is a section taken along line II—II of FIG. 1.

As shown in FIGS. 1 and 2 worms 1 and 2 of an extruder 17 are connected to respective drive shafts or shafts 4 and 5 of a drive housing 3 that is flanged to the end of the extruder 20 with the shafts 4 and 5 extending in the housing 3 along respective parallel axes 4A and 5A. The drive housing 3 carries an electric motor 8 having a single annularly cylindrical stator 9 surrounding both of the axes and driving a stator 10 formed as a ring about an axis 10A parallel to and equidistant between the axes 4A and 5A. The shafts 4 and 6 are formed with respective identical gears 6 and 7 having external teeth 12 that mesh with internal teeth of the rotor 10. Thus in this embodiment the two shafts 4 and 5 and the respective extruder worms 1 and 2 rotate in the same direction about the axes 4A and 5A.

Figure 3:
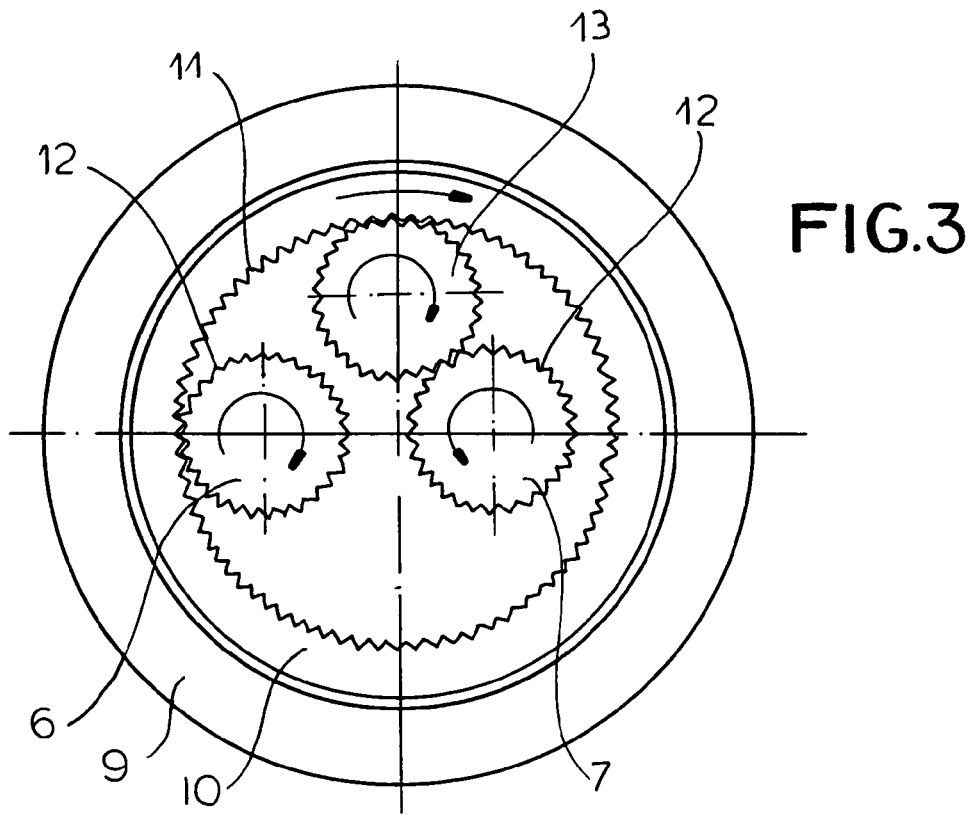
FIG. 3 is a view similar to FIG. 2 of another embodiment.

In the arrangement of FIG. 3 the gear 7 does not mesh with the teeth 11. Instead an intermediate gear 13 meshes with the teeth 11 and with the teeth 12 of the gear 7. Thus the gears 6 and 7 and the respective shafts 4 and 5 and worms 1 and 2 will be driven oppositely.

Figure 4:
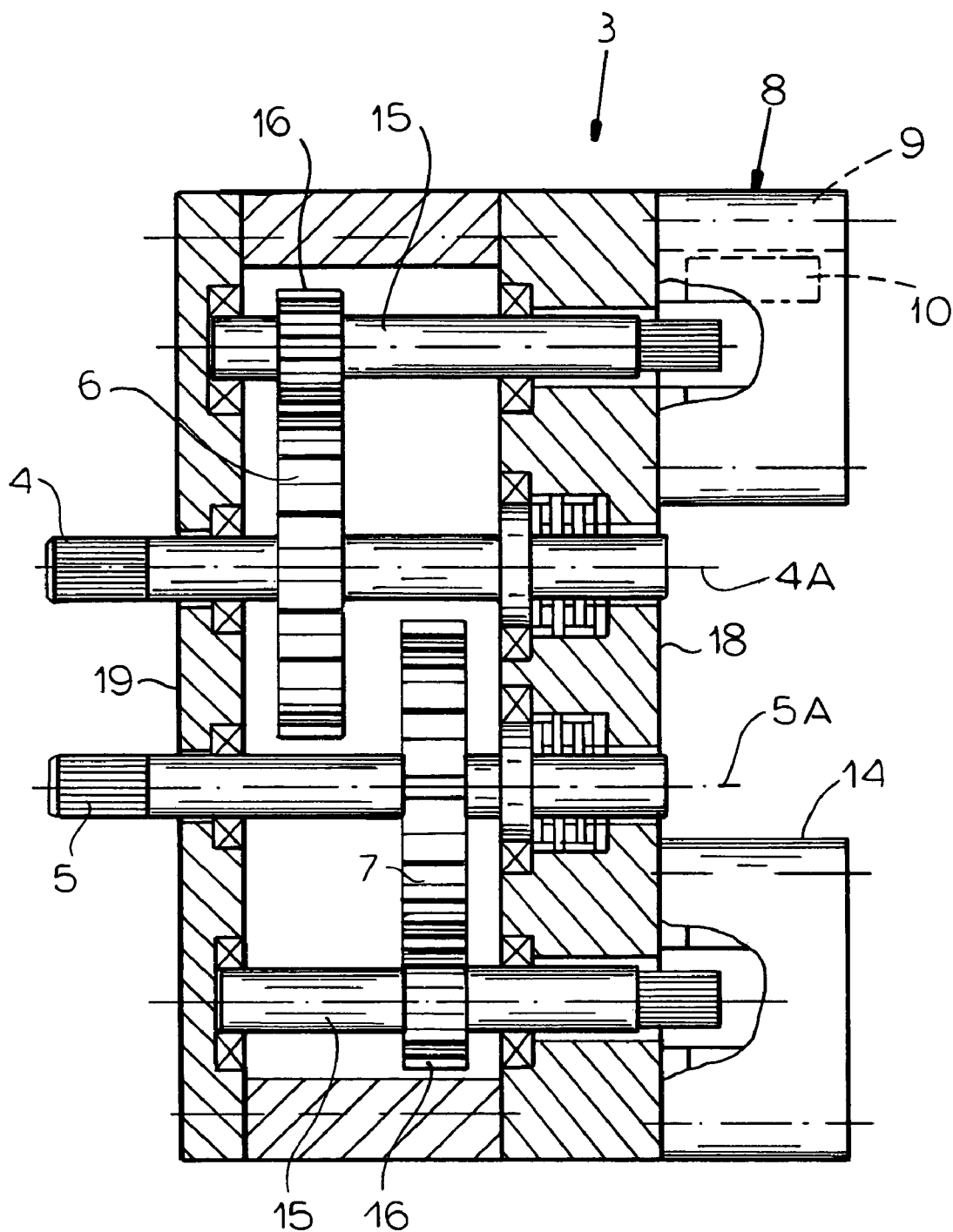
FIG. 4 is a cross sectional view through an extruder drive housing in accordance with a second embodiment of the invention.

FIG. 4 shows an arrangement where the gears 6 and 7 are of much larger diameter, are axially offset from one another, and overlap each other radially. These gears 6 and 7 mesh with respective gears 16 of shafts 15, one of which is driven by the cylindrical rotor 10 of the motor 8 and the other of which is driven by another electric motor identical to the motor 8. Since the gears 6 and 7 overlap, they provide a substantial step down while taking up little extra space so they are completely contained between relatively closely spaced back and front plates 18 and 19 of the housing 3. The shafts 15 symmetrically flank the shafts 4 and 5 and have rotation axes coplanar with the axes 4A and 5A.

Figure 5:
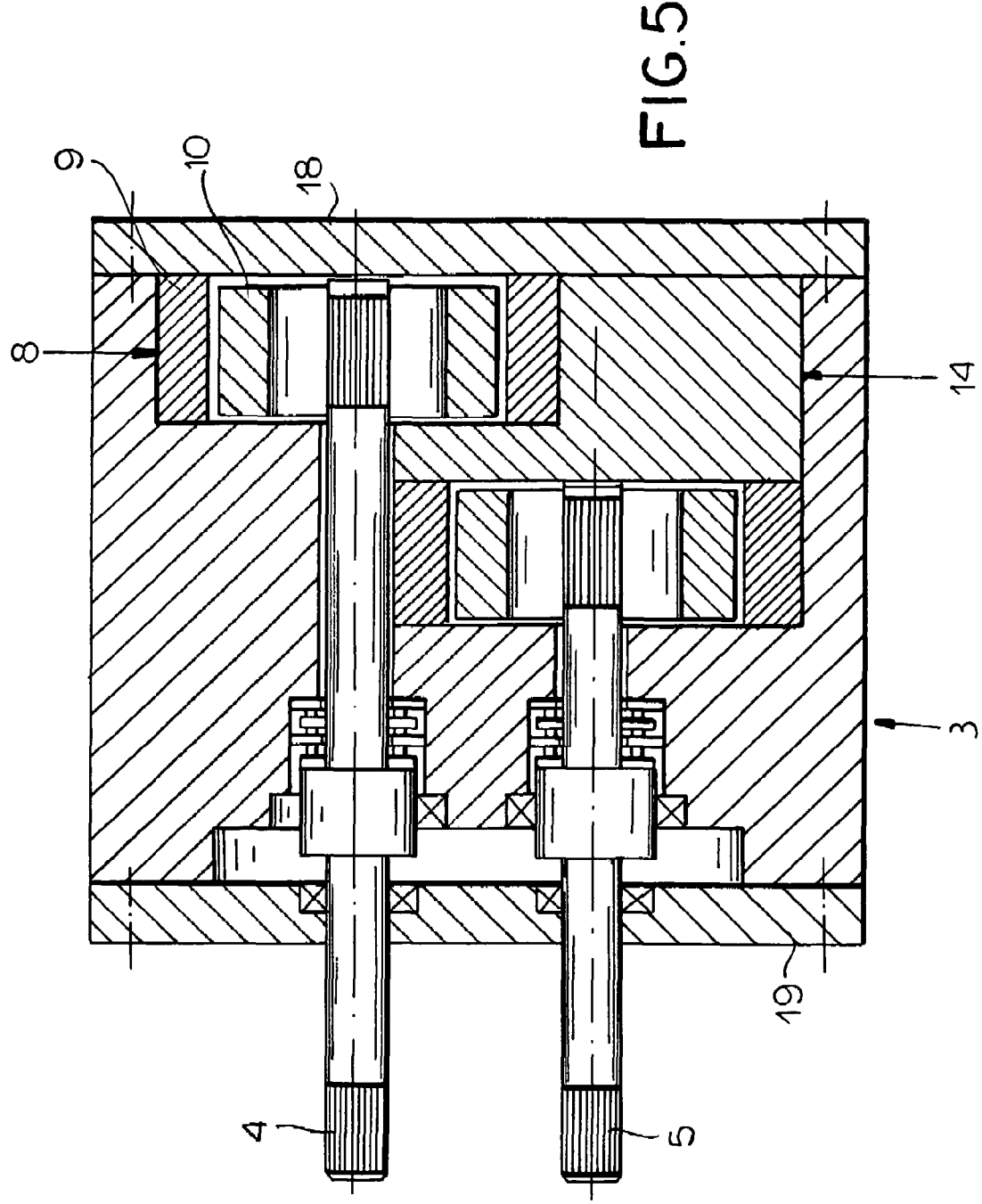
FIG. 5 is a view similar to FIG. 4 of a third embodiment.

In FIG. 5 the two shafts 4 and 5 are seated in the two motors 8 and 14 both contained in the housing 3 between its end plates 18 and 19, but these motors 8 and 14 are axially offset from each other by making the shaft 4 longer than the shaft 5. In this manner the motors 8 and 14 can overlap radially so that the drive housing 3 remains quite small.

We claim:

1. An extruder drive assembly comprising:
   a housing;
   at least two extrusion worms each having a drive shaft extending into the housing; and
   at least one drive motor including at least one cylindrical stator fixed in the housing and a cylindrical rotor cooperating with the stator so as to be rotatably driven by the stator, the rotor surrounding the drive shafts, each of the drive shafts being independently connected to the rotor for driving thereby.

2. The extruder drive assembly defined in claim 1 wherein a single cylindrical stator is disposed in the housing and is surrounded by a single cylindrical stator, all of the drive shafts being connected to the single rotor.

3. The extruder drive assembly defined in claim 2 wherein the single rotor is internally toothed and each of the drive shafts is formed with an externally toothed spur gear, at least one of the spur gears being directly meshed with the internal toothing of the single rotor.

4. The extruder drive assembly defined in claim 3 wherein two of the shafts have their respective spur gears independently meshing with the internal toothing of the single rotor.

5. The extruder drive defined in claim 3 wherein one of the spur gears is directly in mesh with the internal toothing the extruder further comprising
   an intermediate gear in direct mesh between the other of the spur gears and internal toothing.

6. The extruder drive defined in claim 1 wherein there are two cylindrical stators in the housing each surrounding and driving a respective cylindrical rotor, each of the drive shafts being connected with a respective one of the rotors so as to be driven thereby.

7. The extruder drive defined in claim 6 wherein each of the rotors is directly connected to a respective one of the drive shafts.

8. The extruder drive defined in claim 6 wherein at least one rotor is connected by at least one intermediate element with the drive shaft of a respective worm.

9. The extruder drive defined in claim 8 wherein at least one of the rotors drives an intermediate shaft coupled by gearing with the respective drive shaft.

10. The extruder drive defined in claim 9 wherein each of the rotors drives an intermediate shaft coupled by gearing with the respective drive shaft.

* * * * *